United States Patent [19]
McDonald et al.

[11] Patent Number: 5,464,160
[45] Date of Patent: Nov. 7, 1995

[54] METHOD OF PROCESSING VEGETATIVE CROP PRODUCT

[76] Inventors: Dale R. McDonald, 601 Colorado St., Fort Collins, Colo. 80521; Joe B. Laugel, Jr., 1532 Caddoa Dr., Loveland, Colo. 80538; William E. Solomon, 6700 E. Larimer Country Rd. 92, Carr, Colo. 80612

[21] Appl. No.: 213,934

[22] Filed: Mar. 16, 1994

[51] Int. Cl.[6] .......................... B02C 23/24; B02C 23/30
[52] U.S. Cl. ........................ 241/17; 241/19; 241/27
[58] Field of Search ........................... 241/17, 19, 23, 241/24, 27, 29; 131/311, 312

[56] References Cited

U.S. PATENT DOCUMENTS

| | | | |
|---|---|---|---|
| 919,090 | 4/1909 | Thompson | 241/101.4 X |
| 3,661,159 | 5/1972 | Pietrucci | 241/53 X |
| 3,696,817 | 10/1972 | Bonner et al. | 241/154 X |
| 3,814,331 | 6/1974 | Ronning | 241/19 |
| 4,183,471 | 1/1980 | Pfister | 241/57 |
| 4,265,406 | 5/1981 | Palgrave et al. | 241/16 |
| 4,287,708 | 9/1981 | Neely, Jr. | 241/73 X |
| 4,618,415 | 10/1986 | Vecchio et al. | 241/79.1 X |
| 4,624,417 | 11/1986 | Gangi | 241/17 |
| 4,785,999 | 11/1988 | Takijiri | 241/26 |
| 4,942,717 | 7/1990 | Kozub | 241/10 X |

*Primary Examiner*—Timothy V. Eley
*Attorney, Agent, or Firm*—Hovey, Williams, Timmons & Collins

[57] ABSTRACT

An improved method for processing of xanthophyll-containing vegetative crops to yield a relatively xanthophyll rich high protein, essentially non-fibrous friable when dry particulate fraction primarily derived from non-vascular plant leaf or petal tissue, and a separate tougher, particulate fibrous fraction derived principally from plant stem and the leaf vascular xylem and phloem network. A system (20) which is useful for carrying out a preferred method includes a drying assembly (22) for drying crop to a moisture content of 15–30% by weight, a fractionating hammermill (24) to separate crop into a high protein xanthophyll-containing fraction and a high fiber fraction, and individual, downstream high protein and high fiber fraction processing assemblies (26, 28). The hammermill (24) includes an elongated housing (48); a rotor assembly (56) is situated within the housing (48) and includes a plurality of spaced outwardly extending hammers (86) each presenting a rounded leading impact surface (88). An internal screen (58) serves to separate the rotor assembly (56) from the second outlet (54). Blower means is connected to the hammermill for directing air into the hammermill housing to effect separation of a high protein xanthophyll-containing fraction and a high fiber fraction. The downstream processing assemblies (26, 28) serve to collect and optionally pelletize the individual xanthophyll-containing high protein fraction and the high fiber fraction.

9 Claims, 5 Drawing Sheets

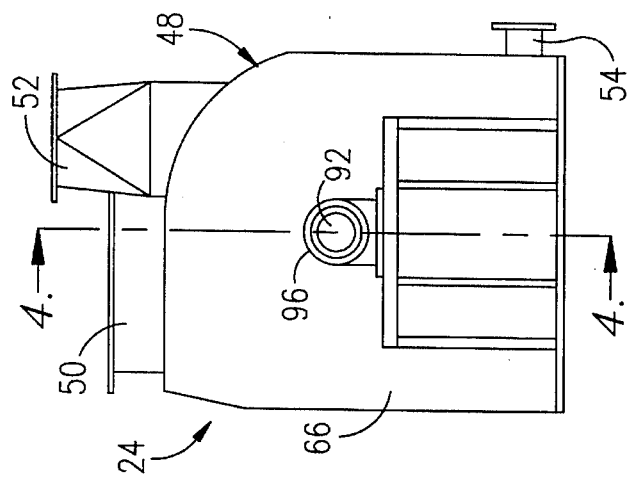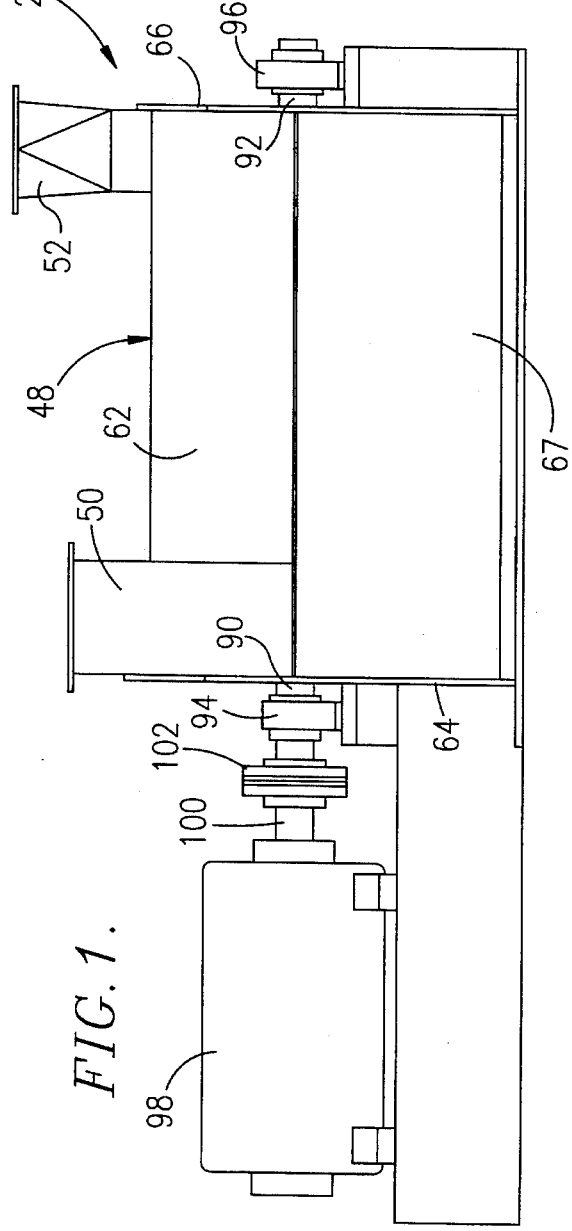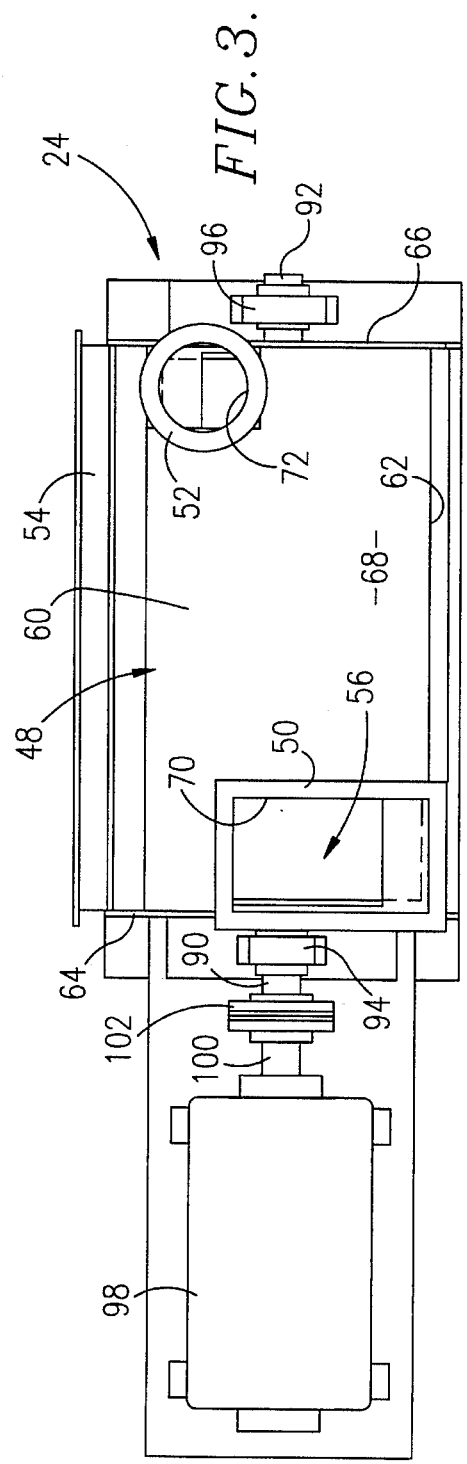

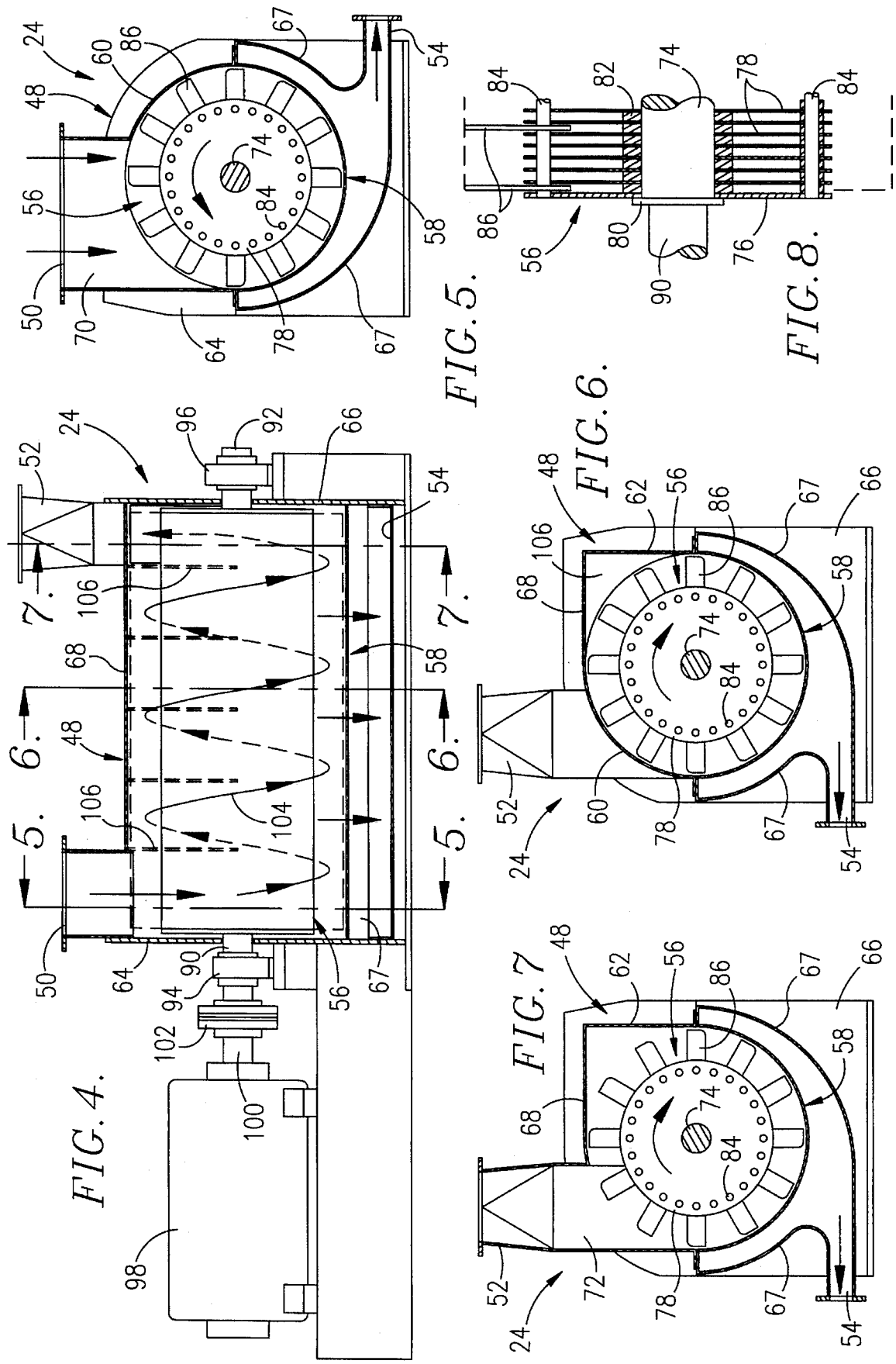

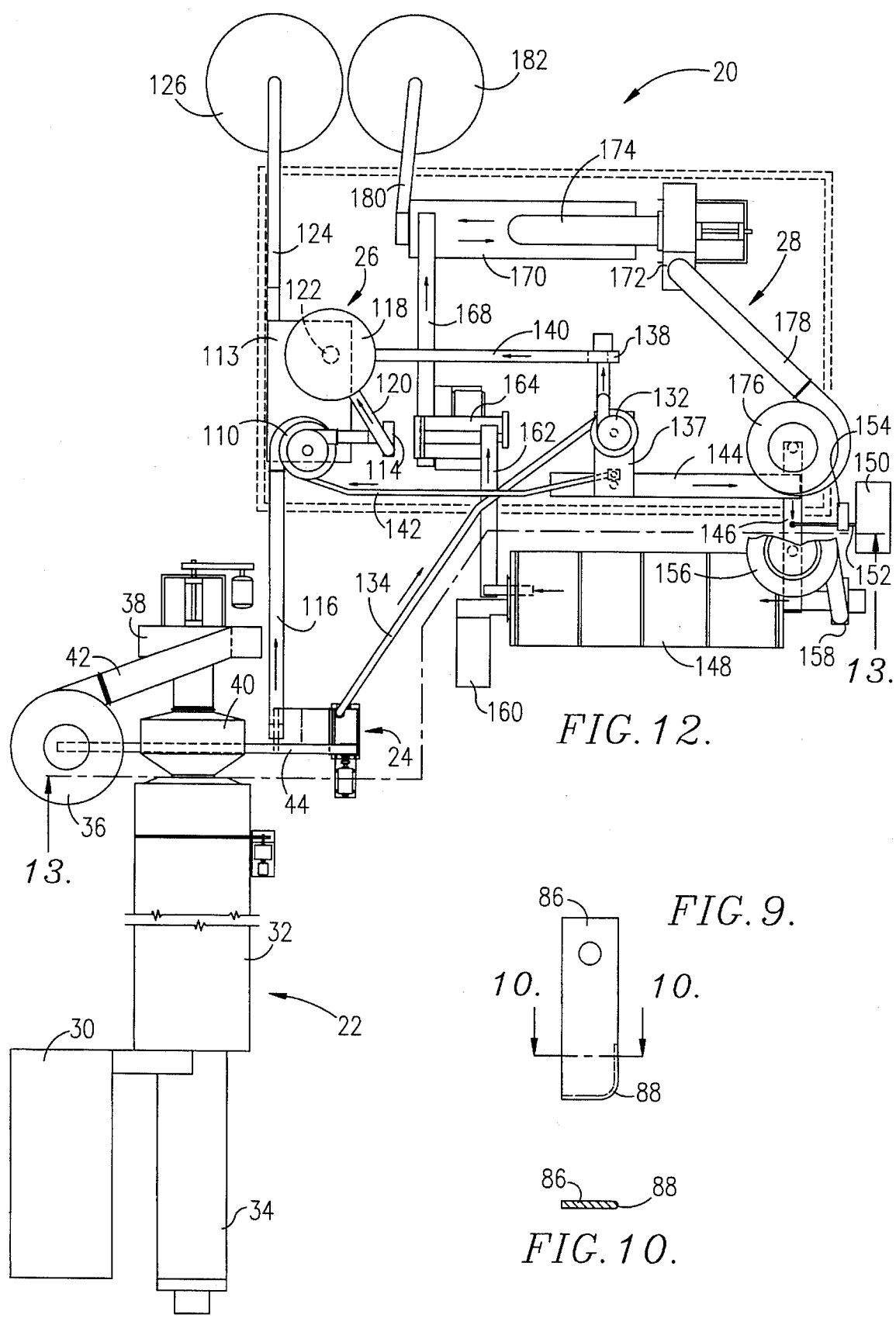

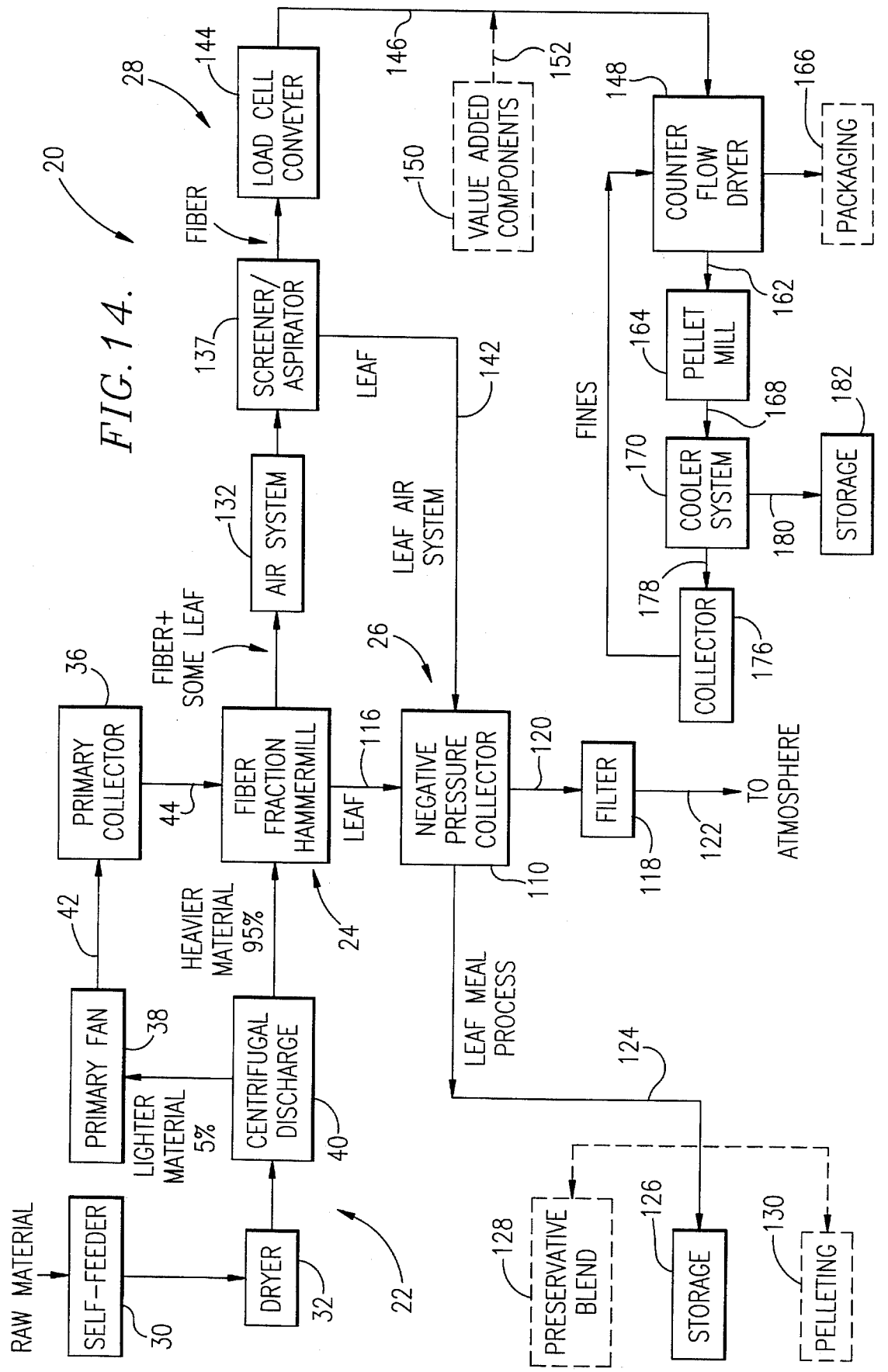

METHOD OF PROCESSING VEGETATIVE CROP PRODUCT

BACKGROUND OF THE INVENTION

1. Field of the Invention

The present invention is broadly concerned with an improved dry fractionation process for treatment of xanthophyll-containing vegetative crops which have a high protein content and high fiber constituents to yield a relatively high protein, essentially non-fibrous friable when dry particulate fraction primarily derived from non-vascular plant leaf or petal tissue (hereinafter "high protein xanthophyll-containing essentially non-fibrous fraction"), and a separate tougher, particulate fibrous fraction derived principally from the leaf or petal vascular xylem and phloem network and from the plant stems as well (hereinafter "high fiber fibrous fraction"). These plant fractions can then be individually processed to give high value products. The invention also comprehends a novel fractionating hammermill especially designed for receiving a vegetative crop and efficiently fractionating the crop into a friable when dry high protein fraction and a tougher high fiber fraction. Using the principles of the invention, a vegetative crop treatment facility can be produced at a relatively low cost as compared with prior wet-processing techniques, while nevertheless giving end products having higher value.

2. Description of the Prior Art

Vegetative crops such as alfalfa are known to contain valuable feed components which if efficiently recovered could represent a decided economic advantage. For example, the relatively friable when dry leaf tissue derived portion of 20% protein grade alfalfa contains about 149 mg/lb. of xanthophylls which are valuable as poultry feed supplements. At present day prices xanthophylls have a market value of about $0.50 per gram. Additionally, the protein content of friable when dry alfalfa leaf tissue is significant, ranging from about 20–32% by weight, and usually from about 20–27% by weight. This product presently sells for about $0.22 per pound. Smaller, though none the less valuable quantities of betacarotene, chlorophyll and saponins are also present. Finally, the tougher fibrous stem and leaf vascular system fraction of alfalfa can be used as a ruminant feed, particularly when treated with urea or other non-protein nitrogen source.

As a practical matter, it has proved difficult to efficiently process alfalfa so as to take full advantage of the inherent value of the various components. This is particularly the case inasmuch as alfalfa is not a government subsidized product as are many of the competitive feeds. However, the principal difficulty has been the lack of an efficient technique for extracting the various feed components of alfalfa.

One prior attempt to economically process alfalfa is the so-called Pro-Xan process. In this proposal, fresh-cut, undried alfalfa is macerated in a screw press in order to separate the liquid content of the leaf fraction containing the xanthophylls and soluble proteins. The resultant press cake can then be used as a ruminant feed. The Pro-Xan process has a number of significant drawbacks, however, most notably the capital cost of the necessary plant which in one case was about $25,000,000. Furthermore, wet processing fails to achieve optimum separation of the potentially valuable feed components of alfalfa and is therefore not truly efficient.

Another vegetative crop containing significant quantities of xanthophylls is the marigold plant. The petals of these flowers are processed commercially for their xanthophyll content and have particular utility as a supplement for poultry feeds to enhance the yellow color of poultry skin and of egg yolks. However, in the past, cultivation and harvesting of marigolds for retrieval of xanthophyll rich petals has involved the labor intensive step of picking the flowers by hand. This is required to separate the flowers from the stem and leaf portion of each of the plants.

SUMMARY OF THE INVENTION

The present invention overcomes the problems outlined above and provides a significantly improved method for the processing of vegetative crops having a relatively friable when dry high protein leaf or petal tissue derived fraction and a significantly tougher fibrous stem and leaf vascular system portion. Broadly speaking, the method of the invention involves first providing a quantity of the vegetative crop which is dried to an average moisture content of from about 15–30% by weight (alfalfa as cut typically has a moisture content of 78–80% by weight). The leaf or petal fraction typically will have a moisture level about one-half or less than that of the stems, leaves or buttons of marigolds. This partially dried crop can then be fractionated to yield a high protein essentially non-fibrous fraction and a separate high fiber fibrous fraction. The fractions can then be individually recovered for optimum economic benefit.

In preferred forms, the moisture content of the vegetative crop is lowered to about 20% by weight prior to fractionating. Crops such as alfalfa, grass, sugar beets and marigolds can be advantageously processed in accordance with the invention, with alfalfa being the most preferred vegetative crop.

The fractionation process broadly involves impacting the partially dried crop to create the separate friable when dry high protein and tougher high fiber fractions. To this end, the invention also includes an improved fractionating hammermill especially designed to achieve the dry fractionation of the invention. Generally, the hammermill serves to impact the vegetative crop by moving the latter along a generally spiral path of travel and into contact with rotating hammers affixed to an internal rotor. This, in conjunction with imported air flow, serves to rapidly separate the friable when dry high protein particulate fraction from the tougher, somewhat more moist high fiber particulate fraction. The fractions are then passed from the hammermill along separate pathways.

In more detail, the preferred fractionating hammermill includes an elongated, generally horizontally oriented housing presenting an incoming product inlet and first and second product fraction outlets, at least the first outlet being axially spaced from the inlet. A rotor assembly is positioned within the housing and includes a rotatable body having a plurality of axially and circumferentially spaced outwardly extending hammers secured thereto. A screen is located within the housing and serves to separate the rotor assembly from the second outlet. In addition, the screen is configured such that the induced air flow causes the incoming, partially dried vegetative crop to traverse a generally spiral path between the inlet and the first outlet, thus avoiding short circuit travel of the product directly between the inlet and first outlet. This assures that the products come into fractionating contact with the rotating hammers for maximum separation of the starting product by imported air into a respective high protein essentially low fiber fraction and a separate high fiber fibrous fraction. This internal structure includes a plurality of spaced apart, plate-like inserts within the housing each presenting an arcuate face adjacent the outermost edges of the rotating hammers, these inserts being located for preventing axial travel of incoming product from the inlet directly to the first outlet.

The preferred overall system includes pneumatic conveying and separating apparatus for passage of the partially dried crop through the fractionating hammermill and thence to individual downstream processing stations. For example, the high protein essentially low-fibrous fraction can simply be collected and stored, or optionally treated with preservatives and/or pelletized. The fibrous, tougher fraction is likewise collected and may be pelleted with or without addition of urea or other added value feed ingredient.

DESCRIPTION OF THE DRAWINGS

FIG. 1 is a side elevational view of the preferred fractionating hammermill in accordance with the invention;

FIG. 2 is an end elevational view of the fractionating hammermill;

FIG. 3 is a plan view of the fractionating hammermill;

FIG. 4 is a vertical sectional view taken along line 4—4 of FIG. 2 and illustrating the internal construction of the hammermill;

FIG. 5 is a vertical sectional view taken along line 5—5 of FIG. 4 and depicting the hammermill rotor assembly as well as the product inlet and lowermost, second product outlet;

FIG. 6 is a vertical sectional view taken along line 6—6 of FIG. 4 and illustrating the rotor assembly, one of the spaced hammermill inserts, and the second product outlet axially spaced from the inlet;

FIG. 7 is a vertical sectional view taken along line 7—7 of FIG. 4 which shows the details of the first product outlet;

FIG. 8 is a fragmentary sectional view with parts broken away illustrating the design of the rotor assembly within the hammermill;

FIG. 9 is an elevational view of one of the hammer members forming a part of the rotor assembly;

FIG. 10 is a sectional view taken along line 10—10 of FIG. 9 which illustrates the rounded impacting edge of the hammer member;

FIG. 12 is a plan view of an overall vegetative crop processing plant in accordance with the invention;

FIG. 14 is a schematic block diagram illustrating the various steps in the preferred processing system of the invention.

DESCRIPTION OF THE PREFERRED EMBODIMENT

Figure 13:
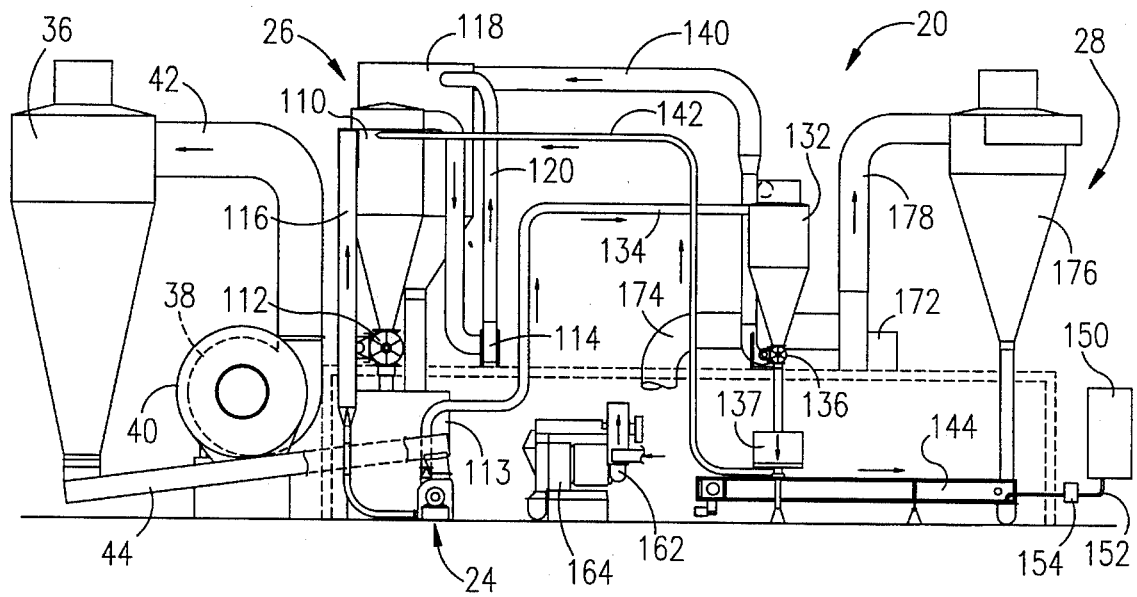
FIG. 13 is a sectional view taken along irregular line 13—13 of FIG. 12 and depicting certain components of the processing plant.

Turning now to the drawings, and particularly FIGS. 12–14, an overall processing system 20 for vegetative crops is illustrated. Broadly speaking, the system 20 includes a drying assembly 22, a fractionating hammermill 24 adapted to receive partially dried crop from assembly 22, downstream high protein xanthophyll-containing essentially non-fibrous fraction processing assembly 26 and downstream high fiber fraction processing assembly 28, the assemblies 26, 28 each being connected to a respective outlet of hammermill 24.

In more detail, the drying assembly 22 includes a feeder 30 adapted to receive incoming, relatively wet xanthophyll-containing vegetative crop as well as a single pass rotating drum dryer 32 heated by a gas-fired furnace/burner 34. A primary collector 36 is operatively coupled with dryer 32 through a primary fan 38, centrifugal separator 40 and conduit 42 (see FIGS. 12–13). The collector 36 has a lower conduit 44 extending to hammermill 24 for delivery of collected material thereto; the conduit 44 includes an internal auger conveyor (not shown). In addition, the centrifugal discharge 40 communicates with conduit 44 in order to move the heavier product from the discharge 40 to hammermill 24 via the internal auger conveyor. Normally, the drying assembly is operated so that the moisture content of the high protein xanthophyll-containing essentially non-fibrous fraction of the vegetative crop entering hammermill 24 is at least about 8% by weight. The temperature and flow rate of the drying air employed in the assembly 22 should be correlated to achieve this end, and also to increase the difference between the moisture contents of the xanthophyll-containing high protein and high fiber portions respectively of the crop.

The fractionating hammermill 24 is illustrated in details in FIGS. 1–6. Broadly speaking, the hammermill 24 includes an elongated, generally horizontal housing 48 presenting a material inlet 50 and first and second product fraction outlets 52, 54. Additionally, the overall mill 24 has an elongated rotor assembly 56 situated within the housing 48. Finally, an arcuate screen 58 is positioned adjacent the 180° of rotor assembly 56 and serves to separate the latter from outlet 54.

In more detail, the housing 48 includes an upright curved sidewall 60, an upright vertical sidewall 62, end walls 64, 66, arcuate bottom wall 67 and top wall 68. Inlet 50 (see FIGS. 1 and 3) is an essentially rectangular, upstanding body adjacent end wall 64, passing through top wall 68, and presenting an inlet throat 70 communicating with the interior of the housing 48. On the other hand, first outlet 52 is axially spaced from inlet 50 and is adjacent end wall 66. The outlet 52 likewise passes through top wall 60 and presents a throat 72 communicating with the interior of the housing. The lower half of housing 48 is defined by bottom wall 67 which extends (see FIG. 6) from the bottoms of sidewalls 60, 62 downwardly to cooperatively form lower secondary outlet 54, the latter extending essentially the full length of the hammermill 24.

The rotor assembly 56 includes an elongated, axially extending central shaft 74 carrying a pair of endmost circular plates 76 (see FIG. 8) as well as a plurality of inner reinforcing plates 78 extending along the length of the shaft in spaced relationship to each other. The end plates 76 are maintained in position by means of retainers 80, whereas the inner plates 78 are maintained in proper axially spaced alignment by means of annular spacers 82 carried on shaft 74. The plates 76, 78 support a series of circumferentially spaced, outboard reinforcing tubes 84 which extend the full length of shaft 74 and are connected with each of the plates 76, 78.

The rotor assembly 56 also carries a plurality of outwardly extending plate-like hammers 86 which are pivotally mounted on the tubes 84 between individual sets of inner and outer plates 76, 78. Each of the hammers 86 (see FIGS. 9–10) is identical and is in the form of a metallic body having an apertured inner end and a rounded leading face 88.

Figure 11:
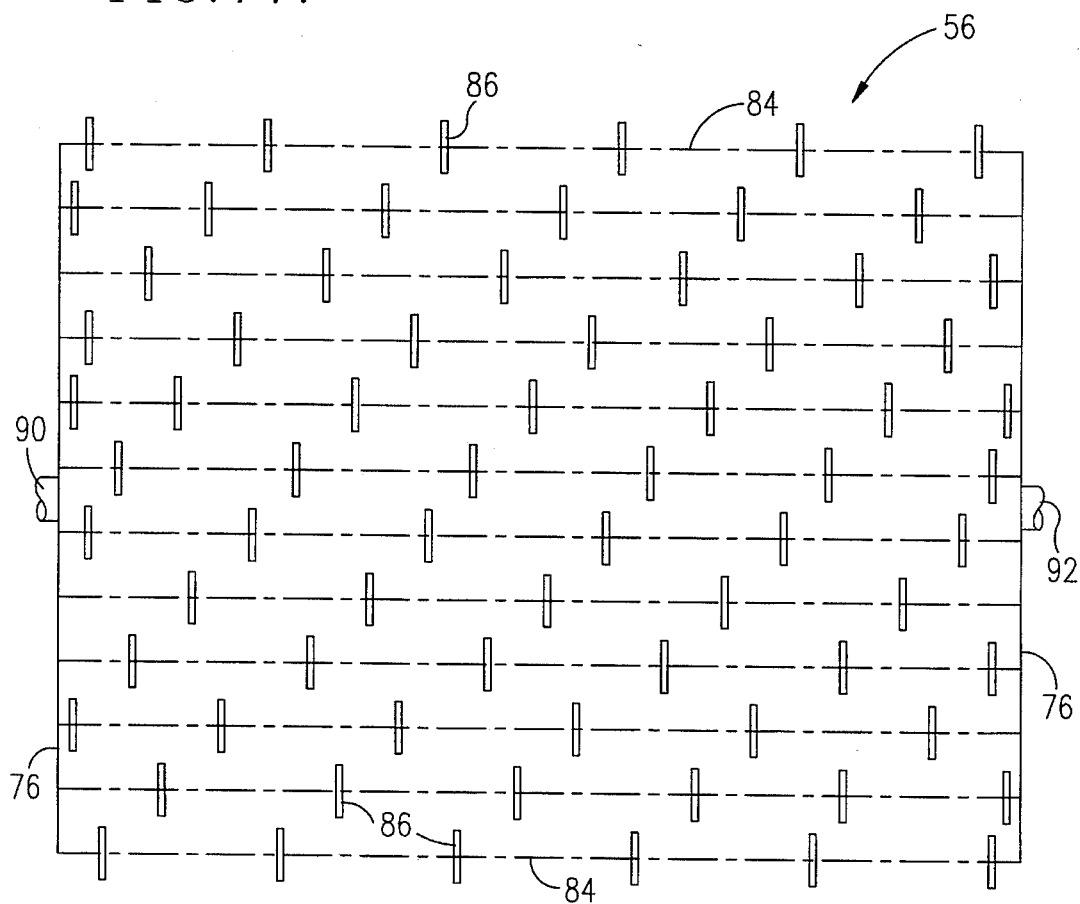
FIG. 11 is a schematic representation of the hammermill rotor assembly, depicting the location of the respective hammer members.

The hammers are not heat treated or otherwise hardened, as this has been found to induce more stringent processing conditions which should be avoided. The spacing pattern for the hammers 86 is schematically illustrated in FIG. 11, where it will be observed that the hammers are both circumferentially and axially spaced along the length of the rotor assembly.

The rotor assembly 56 is mounted for rotation within housing 48. As best seen in FIG. 4, a pair of mounting shafts 90, 92 are axially aligned with main shaft 74 and are received within corresponding bearings 94, 96 respectively located exteriorly of housing 48 adjacent the end walls 64, 66. A drive motor 98 is supported adjacent bearing 94 and includes an output shaft 100 connected via coupler 102 to shaft 90. In this fashion, the entire rotor assembly 56 may be rotated to achieve a desired tip speed (e.g., from about 10,000–15,000 ft/min., more preferably from about 11,000–12,000 ft/min.) for optimum processing of partially dried vegetative crop within hammermill 24.

The configuration and disposition of the screen 58 of hammermill 24 causes incoming product delivered to inlet 50 to traverse a generally spiral path along the length of housing 48 and rotor assembly 56. This spiral path is indicated by arrow 104 in FIG. 4. In particular, the hammermill 24 is provided with a total of five baffle-type inserts or plates 106 provided at spaced locations along the length of housing 48. As best illustrated in FIG. 6, each of the plates 106 has essentially rectilinear upper edges conforming to housing walls 62, 68, as well as an inboard, arcuate lower edge 108 complemental with the path of travel of the outermost edges of the respective hammers 86 during rotation of rotor assembly 56. In effect, the plates 106 prevent "short circuiting" of air and product to be processed directly from inlet 50 to outlet 52. In so doing, it is assured that incoming product is retained within the hammermill 24 for a sufficient residence time to insure complete processing.

The screen 58 is arcuate in cross-section as illustrated in FIGS. 5–7. It is aligned adjacent rotor assembly 56 about the lower 180° thereof. In practice, the screen should have openings of from about $\frac{1}{32}-\frac{1}{8}$ inches.

The operation of hammermill 24 is intended to effectively fractionate the partially dried incoming alfalfa or other xanthophyll-containing vegetative crop. In particular, the incoming crop is fractionated by virtue of the rotating rotor assembly 56, which serves to separate the high protein xanthophyll-containing essentially non-fibrous friable when dry fraction from the somewhat more moist fibrous stem fraction. The friable leaf or petal fraction is comminuted and passes through screen 58 for exit through lowermost second outlet 54; generally, the moisture content of the leaf fraction at this point is not significantly changed throughout the remainder of downstream processing of the leaf fraction. Conversely, the fibrous fraction passes upwardly through first outlet 52.

Again referring to FIGS. 12–14, it will be seen that the leaf or petal processing assembly 26 includes a negative pressure cyclone collector 110 equipped with an airlock 112, collection box 113 and negative pressure fan 114. A conveying line 116 extends from lower outlet 54 of hammermill 24 to the top of collector 110. A conventional filter 118 is likewise coupled to fan 114 via line 120, and includes an atmospheric vent 122. The xanthophyll-containing leaf or petal product fraction collected in box 113 is then conveyed via bucket elevator 124 to storage bin 126. In alternative forms, the leaf fraction can be mixed with preservatives as illustrated at 128, and/or may be pelleted as at 130.

The downstream stem assembly 28 is adapted to receive the output from upper outlet 52 of hammermill 24. In particular, this assembly 28 includes a negative pressure collector 132 coupled to outlet 52 by means of conduit 134. The collector is equipped with a lower airlock 136 and screener/aspirator 137. A fan 138 is coupled to the screener/aspirator 137 as shown. A conduit 140 extends from the positive pressure side of fan 138 to filter 118 as shown, in order to filter the output air from the collector 132. In addition, a conduit 142 is provided between screener/aspirator 137 and collector 110 for conveying overhead lightweight xanthophyll-containing leaf or petal fraction back to the assembly 26.

The primary output from screener/aspirator 137 is directed onto a load cell conveyor 144, in order to determine the quantity of fibrous stem fraction delivered from the screener/aspirator. The product is then delivered from the conveyor 42 to a secondary conveyor 146, whereupon the product is fed to a conventional counterflow dryer 148. As illustrated in FIGS. 12–14, value added components may be added to the fibrous stem and/or leaf product prior to entrance into the dryer 148. For example, a urea tank 150 having an output line 152 equipped with metering pump 154 is situated adjacent secondary conveyor 146 and serves to deliver liquid urea onto the fibrous fraction prior to entrance into dryer 148. It will be observed that the dryer 148 is equipped with a cyclone separator 156 and fan 158 adjacent the inlet thereof, which is used to remove fines from the airstream passing through dryer 148, and to return such fines directly to the secondary conveyor 146. Finally, dryer 148 includes a burner 160 for providing heated air to the dryer.

The output from dryer 148 passes via conveyor 162 to pellet mill 164 in order to pelletize the fibrous fraction into convenient sized product. As illustrated in phantom in FIG. 14, the dried product may alternately be directly packaged as at 166, in lieu of pelleting.

After pelleting, the sized product is moved via conveyor 168 to a two-pass horizontal cooler 170 which serves to cool the pellets to ambient temperature. The cooler 170 has a fan 172 connected thereto via conduit 174 for delivery of cooling air into the interior of the cooler 170. In addition, a positive pressure collector 176 is coupled to fan 172 by means of conduit 178, in order to collect fines within the air currents passing through collector 170. These fines are then conveyed from the bottom of collector 176 to secondary conveyor 146 for recycling through the system. Cooled pellets exiting cooler 170 are conveyed via bucket elevator structure 180 to storage tank 182.

The present invention provides a technique for materially increasing the economic value of a xanthophyll-containing vegetative crop. For example, consider the hypothetical situation where 2,000 pounds of 18% protein alfalfa are to be processed. Such a starting material would also contain approximately 23% fiber and 260,000 grams of xanthophylls. If this product were sold without processing, at current market values it would be worth about $100. However, when processed in accordance with the present invention, the fiber fraction would have a value of $60 and the leaf fraction $70.40, thereby giving a total value for the ton of processed material of $130.40.

In the foregoing hypothetical, it is assumed that the hammermill receives inlet air at 1,000–2,000 cfm/ton, and that the two outlets each handle 500–1,000 cfm/ton of outlet air respectively. The 2,000 pound starting alfalfa is fractionated to yield 800 pounds of a high protein fraction (25% by weight protein, 13% by weight fiber and 176,000 grams of xanthophylls), and 1,200 pounds of fiber fraction (13.3% by weight protein, 33% by weight fiber and 84,000 grams of xanthophylls). Energy input to the hammermill is assumed to be 10 horsepower per ton of starting alfalfa. The values employed for the final products are assumed to be: $0.22 per pound for protein; $0.05 per pound for fiber; and $0.40 per gram for xanthophylls.

We claim:

1. A method of processing a vegetative crop product having a high protein xanthophyll-containing portion and a high fiber portion respectively, said method comprising the steps of:

providing a quantity of said xanthophyll-containing vegetative crop product having a moisture content of from about 15–30% by weight;

establishing an elongated, generally horizontally oriented product treatment zone;

introducing vegetative crop to be treated into the product treatment zone through an upper incoming product inlet;

subjecting vegetative crop in the treatment zone to blows from circumferentially spaced, outwardly directed hammers rotatable within the zone about the longitudinal axis thereof and which thereby define a perimeter of the zone, for a time sufficient to produce a friable when dry high protein xanthophyll-containing particulate fraction, and a tougher high fiber fraction having a higher moisture content than the friable fraction;

inducing an imported flow of air through the treatment zone to enhance separation of said high protein particulate fraction from the high fiber fraction produced by impact of the hammers with the crop undergoing fractionation;

allowing portions of the crop undergoing treatment in said zone to exit from said perimeter thereof into a series of separate chambers located along the length of the zone between the product inlet and the upper product outlet above the axis of rotation of the hammers;

preventing said separate portions of the crop received in separate chambers from short circuiting from one chamber to the next adjacent chamber;

permitting crop which enters respective chambers to gravitate back into the zone;

separating the high protein particulate fraction from the high fiber fraction produced in the zone and thereafter allowing the separated high protein particulate fraction to escape from the zone through a lower product outlet; and permitting the high fiber fraction to escape from the zone through an upper product outlet spaced axially from the product inlet of the zone.

2. The method of claim 1, said moisture content being about 20% by weight.

3. The method of claim 1, said method including the step of:

causing said crop to move along a generally spiral path of travel through said treatment zone.

4. The method of claim 1, including the step of pelleting said high fiber fraction.

5. The method of claim 4, including the step of applying urea to said high fiber fraction prior to pelleting thereof.

6. The method of claim 1, including the step of pelleting said high protein fraction.

7. The method of claim 1, said high protein fraction having a protein content of from about 22–32% by weight.

8. The method of claim 1, said vegetative crop being selected from the group consisting of alfalfa, grass, sugar beets and marigolds.

9. The method of claim 8, said crop being alfalfa.

* * * * *

UNITED STATES PATENT AND TRADEMARK OFFICE
CERTIFICATE OF CORRECTION

PATENT NO. : 5,464,160
DATED : November 7, 1995
INVENTOR(S) : Dale R. McDonald, et. al.

It is certified that error appears in the above-indentified patent and that said Letters Patent is hereby corrected as shown below:

Title page, item [73], Assignee: should be-- Richard L. Ronning, Overlan Park, Kansas; assignee of partial interest.--

Signed and Sealed this

Seventh Day of May, 1996

*Attest:*

BRUCE LEHMAN

*Attesting Officer*  *Commissioner of Patents and Trademarks*